July 10, 1928.
A. N. E. BOOS
1,676,629
RECORDING APPARATUS
Filed Dec. 15, 1920  10 Sheets-Sheet 1
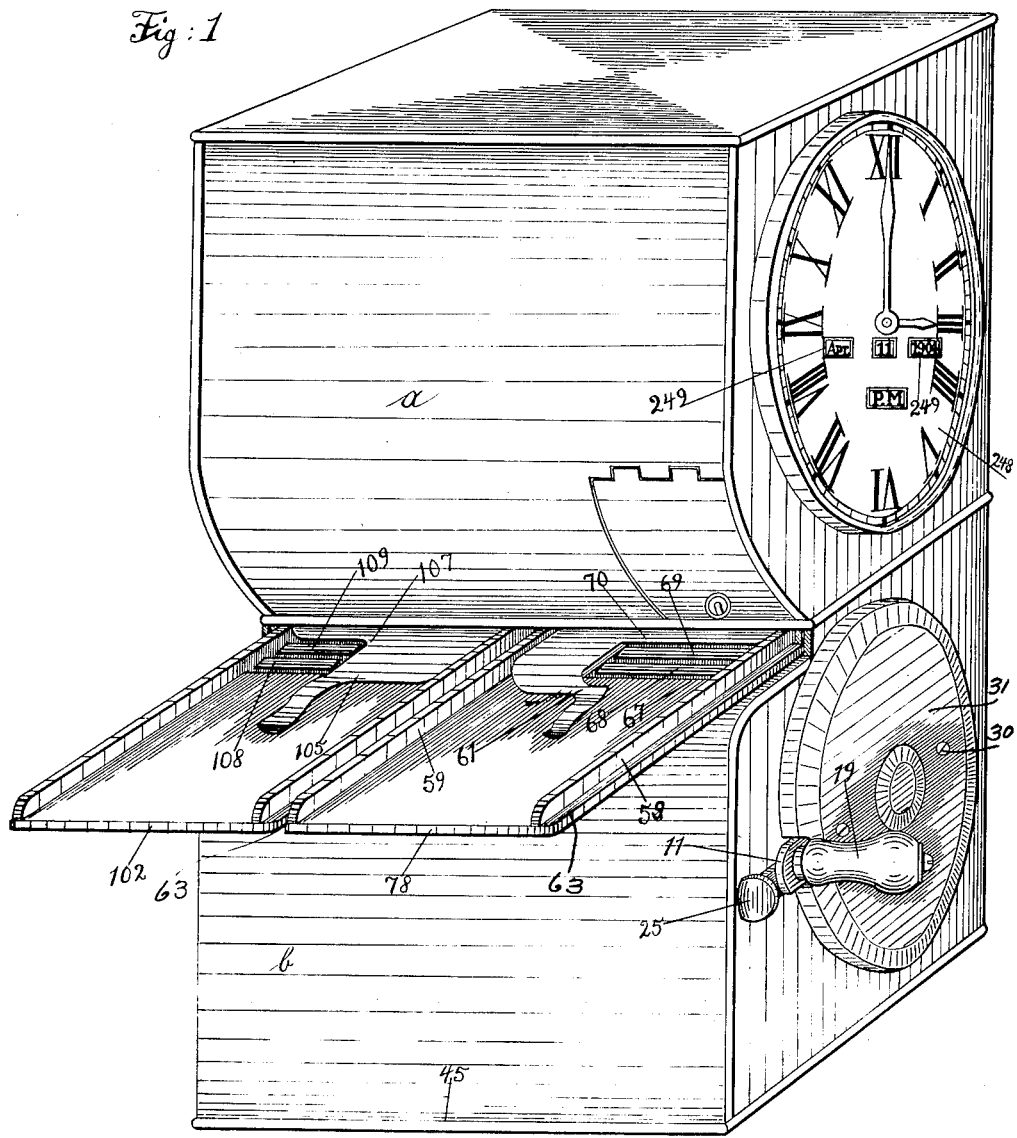

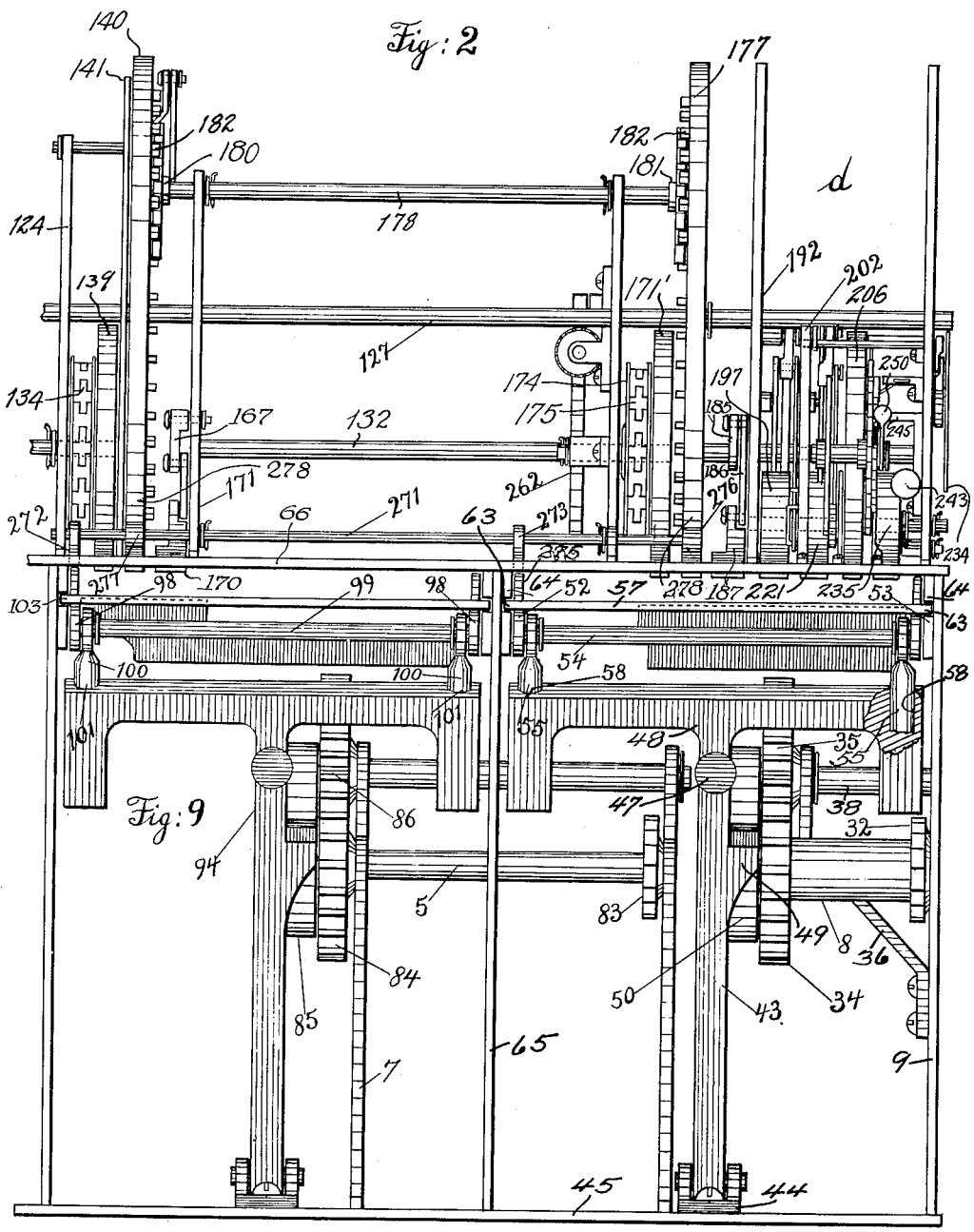

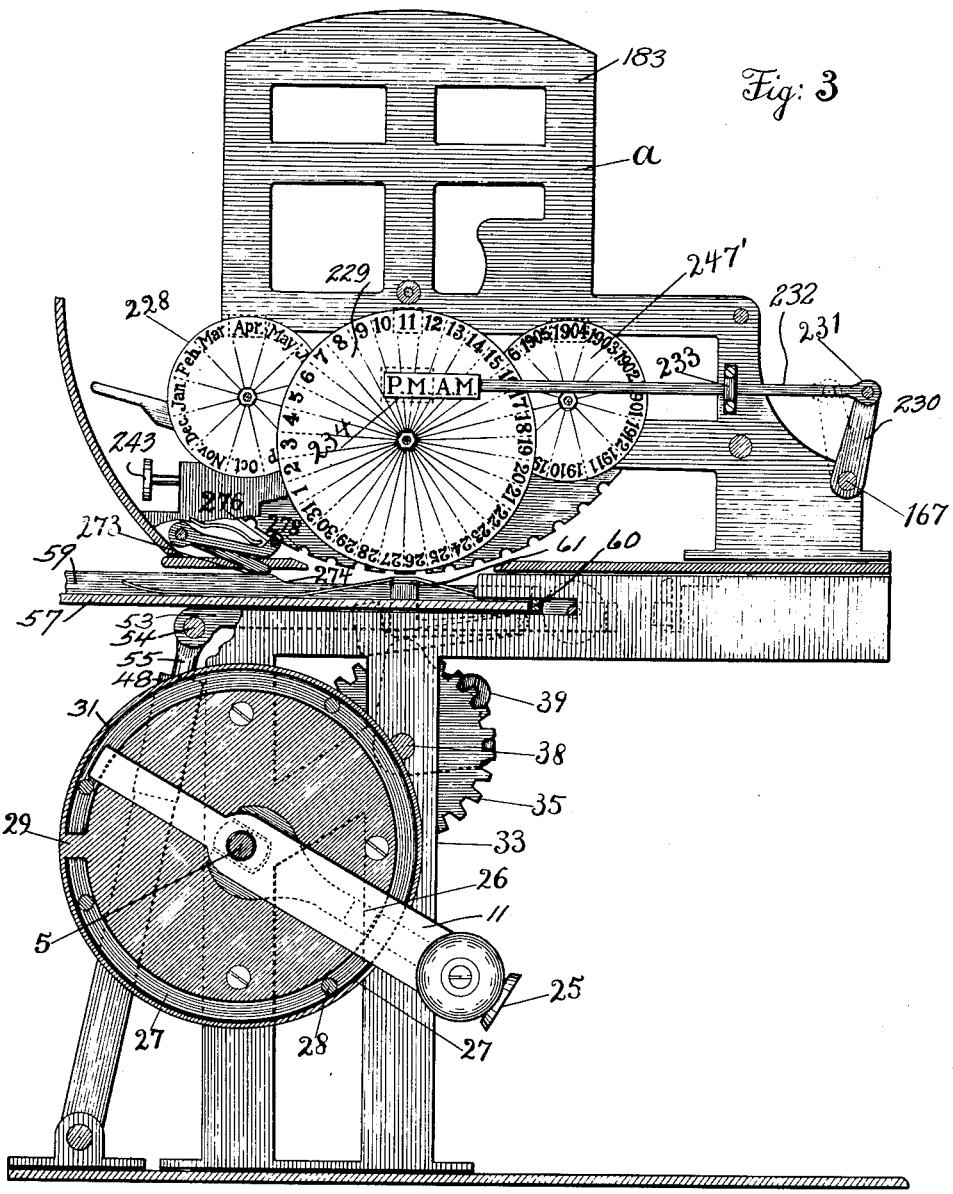

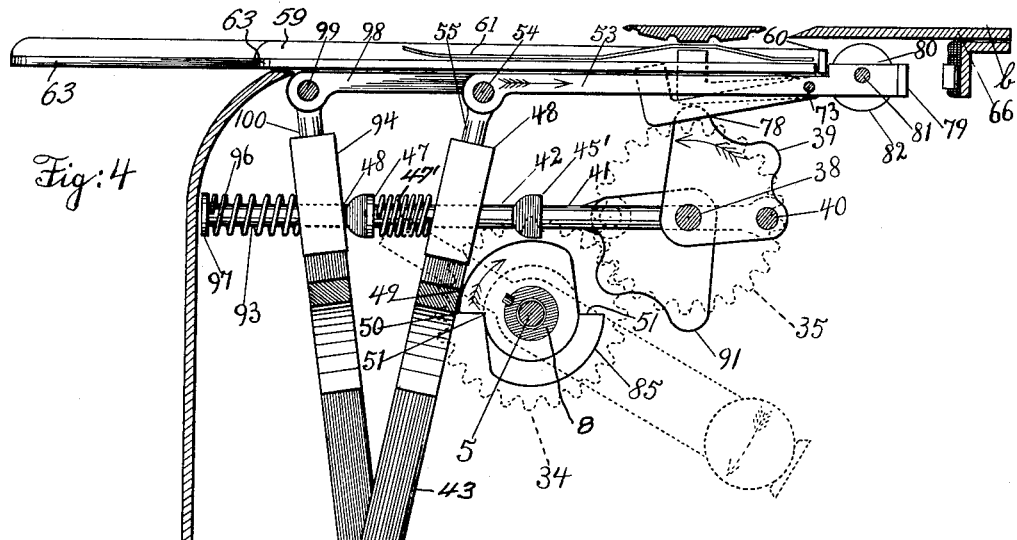
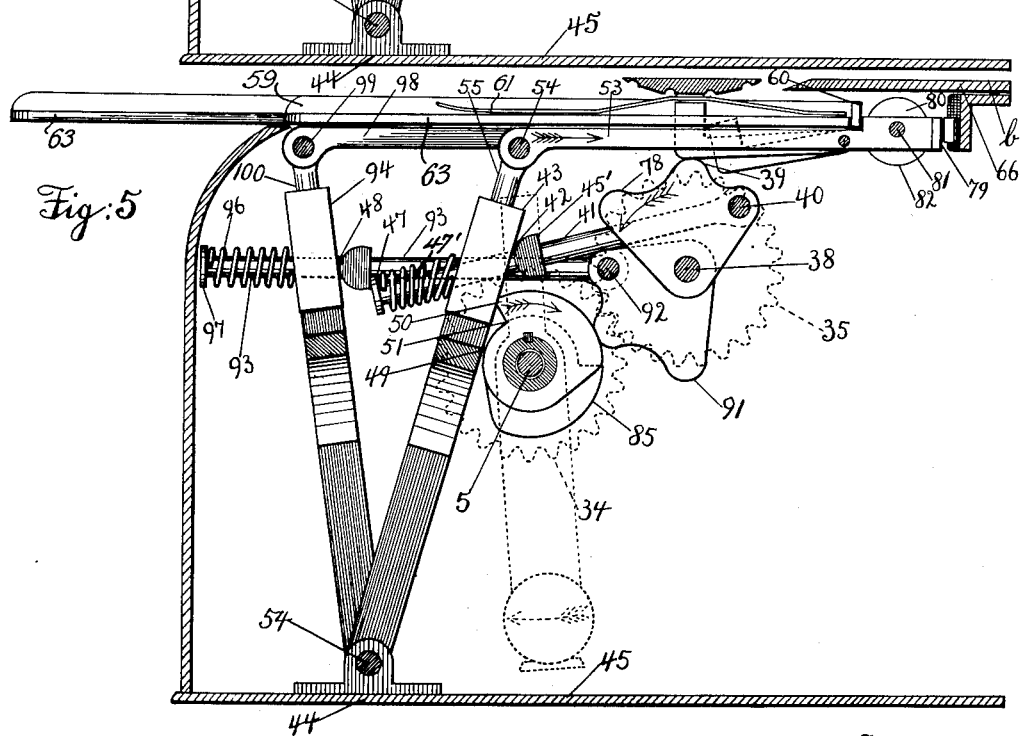

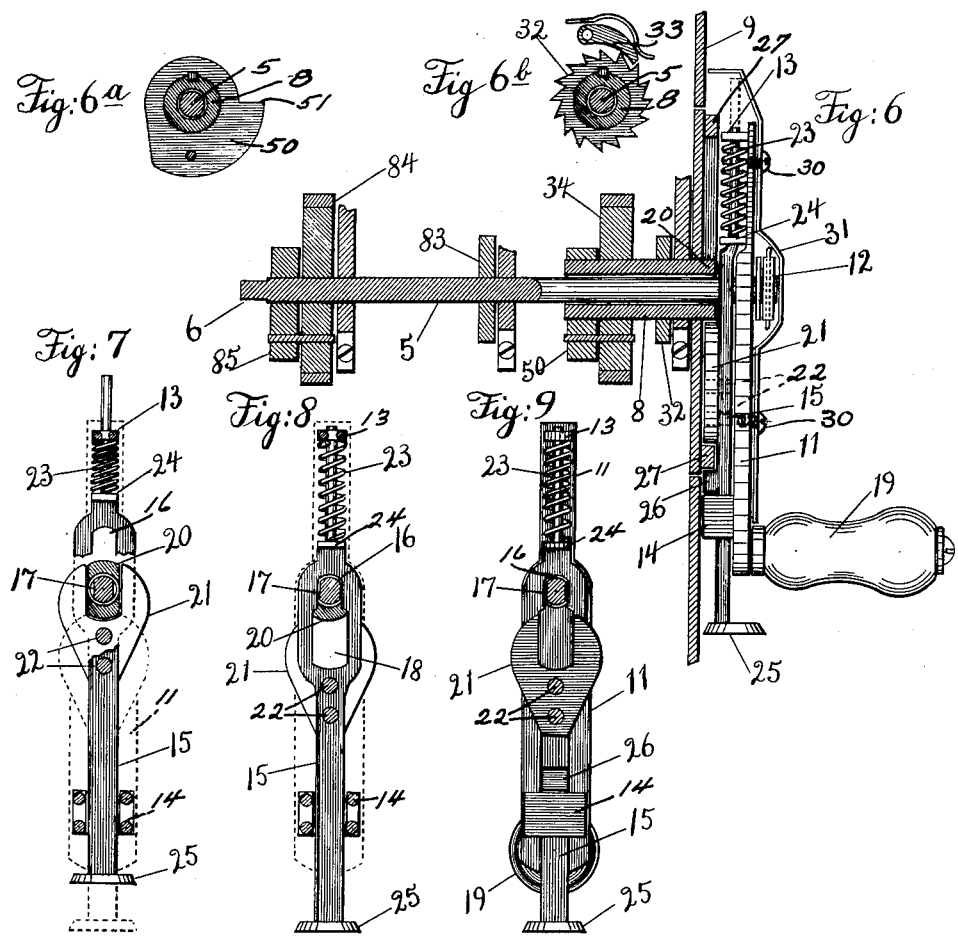
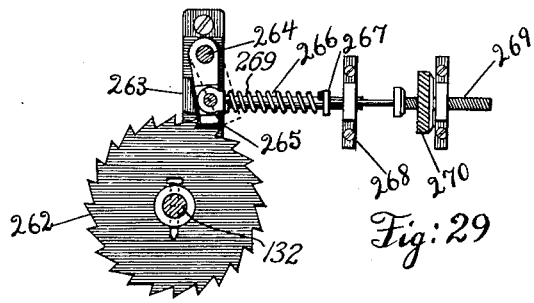

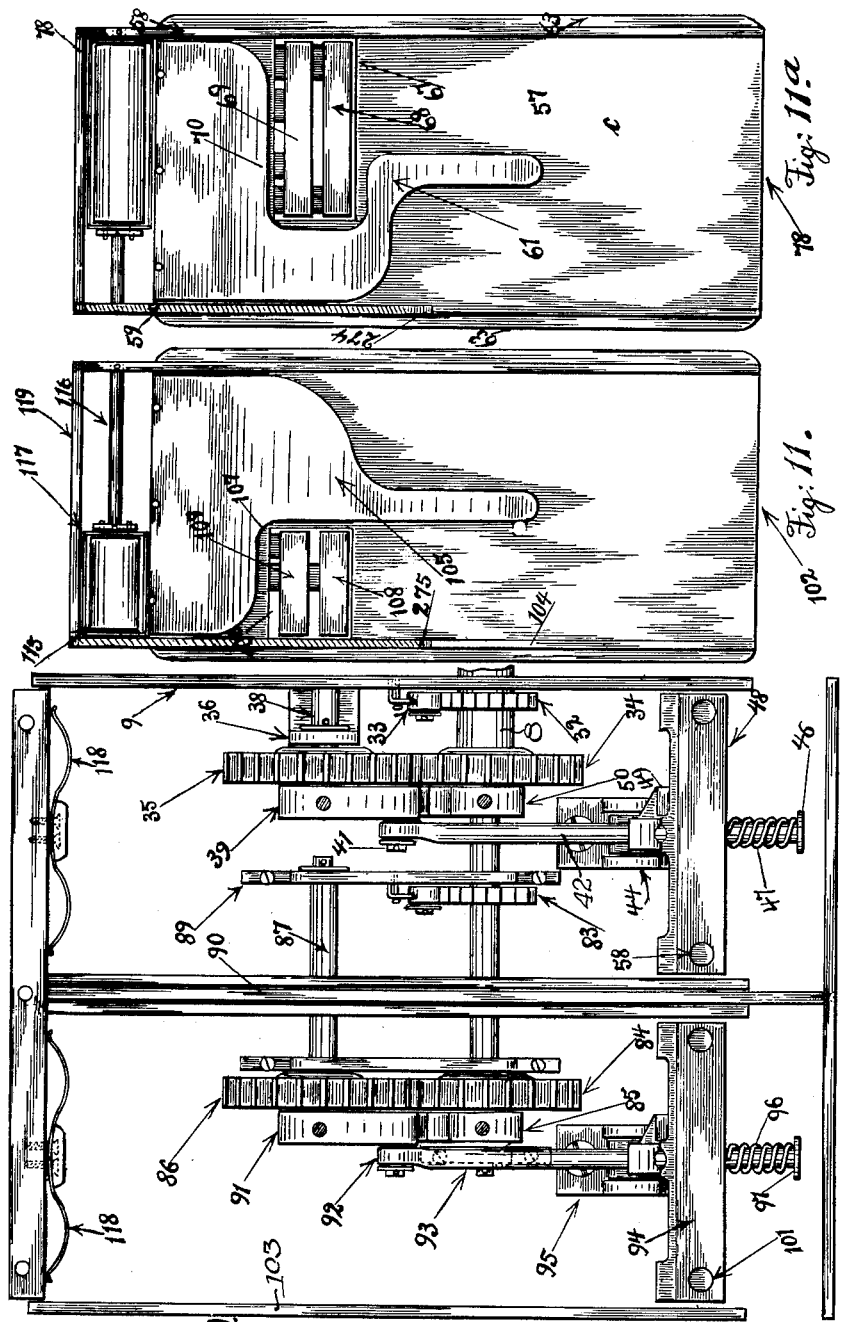

July 10, 1928.
A. N. E. BOOS
1,676,629
RECORDING APPARATUS
Filed Dec. 15, 1920   10 Sheets-Sheet 7
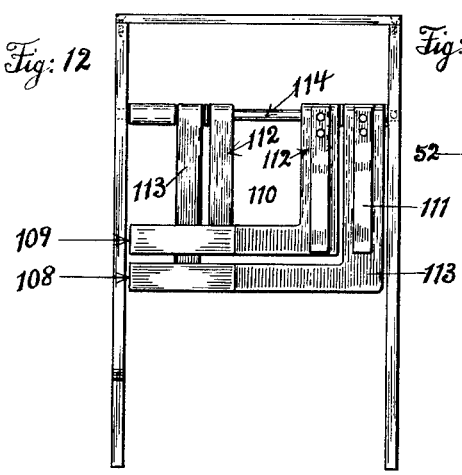
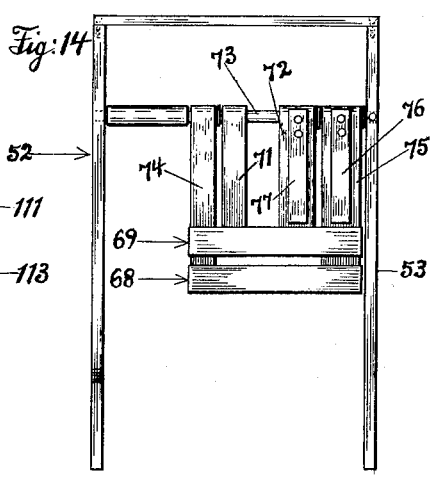
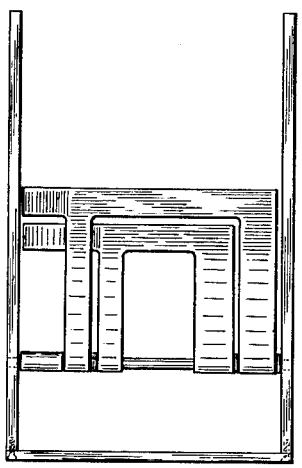
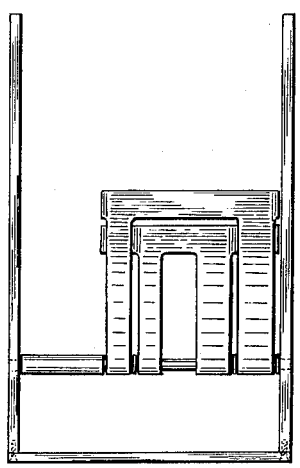
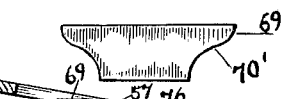
Inventor
August N. E. Boos
By his Attorney G. P. Goepel July 10, 1928.

A. N. E. BOOS

RECORDING APPARATUS

Filed Dec. 15, 1920   10 Sheets-Sheet 8

Inventor
August N. E. Boos
By Attorney
C. P. Goepel

July 10, 1928.  A. N. E. BOOS  1,676,629
RECORDING APPARATUS
Filed Dec. 15, 1920   10 Sheets-Sheet 9

Inventor
August N. E. Boos
By his Attorney

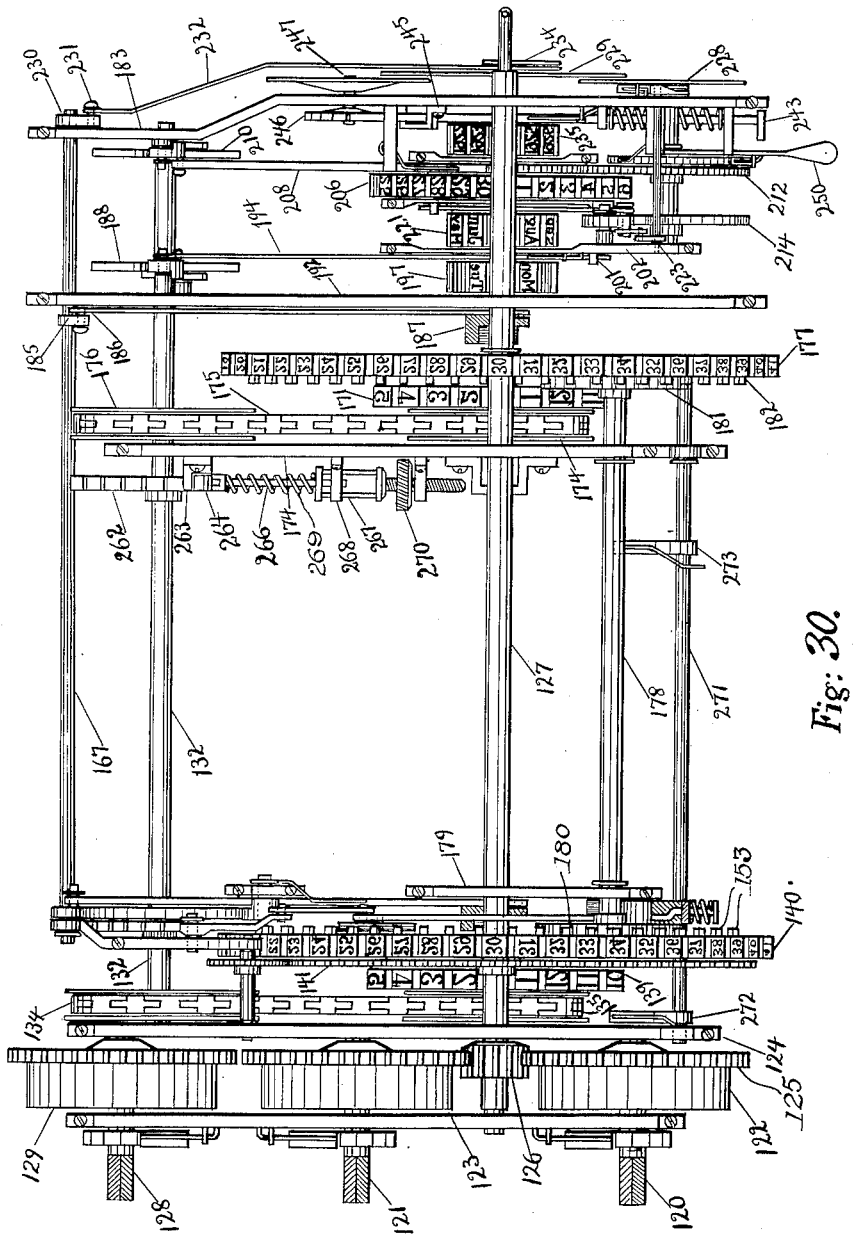

Patented July 10, 1928.

1,676,629

UNITED STATES PATENT OFFICE.

AUGUST N. E. BOOS, OF NEW YORK, N. Y.

RECORDING APPARATUS.

Application filed December 15, 1920. Serial No. 430,911.

The present invention relates to improvements in recording apparatus for use in connection with clocks or the like, and has for its general object to provide a record or memorandum in duplicate from which may be computed, the elapsed time in the performance of a transaction together with a duplicate record of the day, date, month, and year of said transaction.

Another object is the production of a recording mechanism adapted to control and operate a clock work synchronously therewith.

A feature of the present invention is the holding of the time recording mechanism against movement during the printing of the record.

Another feature of the invention is to accomplish the printing of the record in duplicate by a single manual operation.

One embodiment of the invention consists essentially of a multiplicity of printing wheels which are arranged to be driven from a suitable power source such as a spring motor. These wheels carry type faces and operate automatically to produce on a card the desired inscriptions in duplicate, such as the time, day, month and year together with an inscription such as A. M.—P. M. to indicate whether or not the hour is before or after noon.

Associated with such mechanism is a suitable carriage or carriages for supporting the card or other object to be printed upon movable platens which at predetermined intervals are automatically projected through openings in the carriages so as to move the object upon which the inscription is to be recorded into contact with the type faces of the mechanism before referred to.

To these ends the invention resides in certain constructions, arrangements, and combinations of parts, an embodiment of which is fully described in the following specification, reference being had to the accompanying drawings forming part thereof, and in which:

Figure 1, is a perspective view of a recording apparatus constructed in accordance with the present invention, and showing two cards in their relative positions with respect to the initial and final time stamping mechanisms.

Figure 2, is a front elevation of the apparatus with the casing removed and certain parts broken away.

Figure 3, is a right hand side elevation of the same.

Figure 4, is a fragmentary longitudinal section taken through the forward portion of the apparatus, showing the card receiving mechanism in one position.

Figure 5, is a similar view with the receiving mechanism in another position.

Figure 6, is a detail side elevation partly in section, of the operating shaft and the parts carried thereby.

Figure 6ª, is a detail view of one of the cams for actuating the rocker arms.

Figure 6ᵇ, is a detail of the locking means for holding the outer shaft from backward movement.

Figure 7, is a detail sectional view through the operating shaft, showing the handle controlling dog and its parts in contracted position.

Figure 8, is a detail view of the same with the dog expanded.

Figure 9, is a view similar to Figure 7, showing the inner side of the handle in its relation to the dog.

Figure 10, is a detail plan view of the carriage operating mechanism.

Figure 11, is a detail plan view of one of the carriages.

Figure 11ª is a similar view of the second carriage.

Fig. 12 is a detail plan of the platen employed in connection with printing a sheet shown in Fig. 1.

Fig. 13 is a bottom plan view of Fig. 12.

Fig. 14 is a view similar to Fig. 12 of the platen employed in connection with the printing of the sheet shown in Fig. 1.

Fig. 15 is a bottom plan of Fig. 14.

Fig. 16 is a detail front elevation of the inner platen shown in Fig. 12.

Fig. 17 is a detail side elevation of the inner platen shown in Fig. 16.

Fig. 18 is a detail front elevation of the outer platen shown in Fig. 12.

Fig. 19 is a detail side elevation of the outer platen shown in Fig. 12.

Fig. 20 is a detail front elevation of the inner platen shown in Fig. 14.

Fig. 21 is a detail side elevation of the platen shown in Fig. 20.

Fig. 22 is a detail front elevation of the outer platen shown in Fig. 14.

Fig. 23 is a detail side elevation of the platen shown in Fig. 22.

Figure 24:
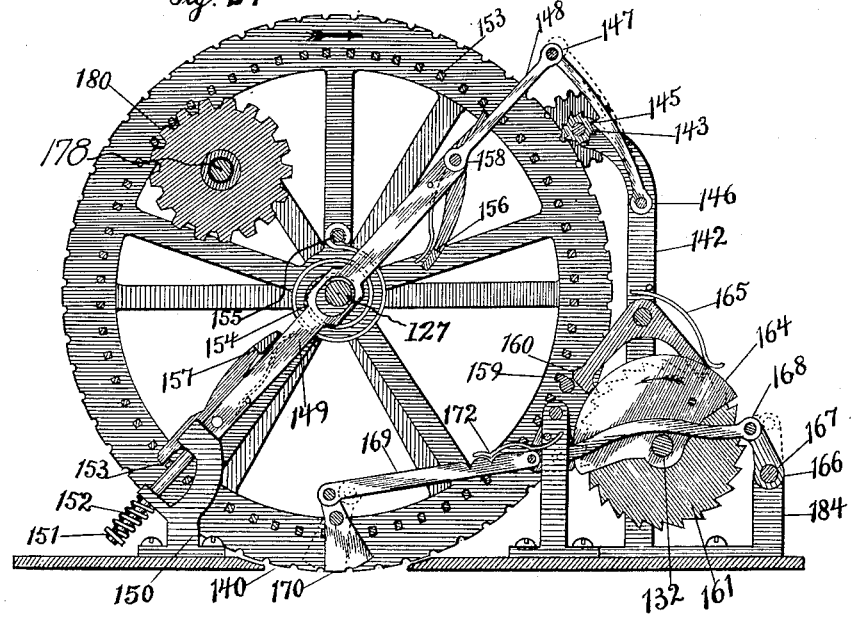

Fig. 24 is a detail front elevation partly in section of the minute wheel, the A. M. and P. M. stamp and the operating device therefor.

Figure 25:
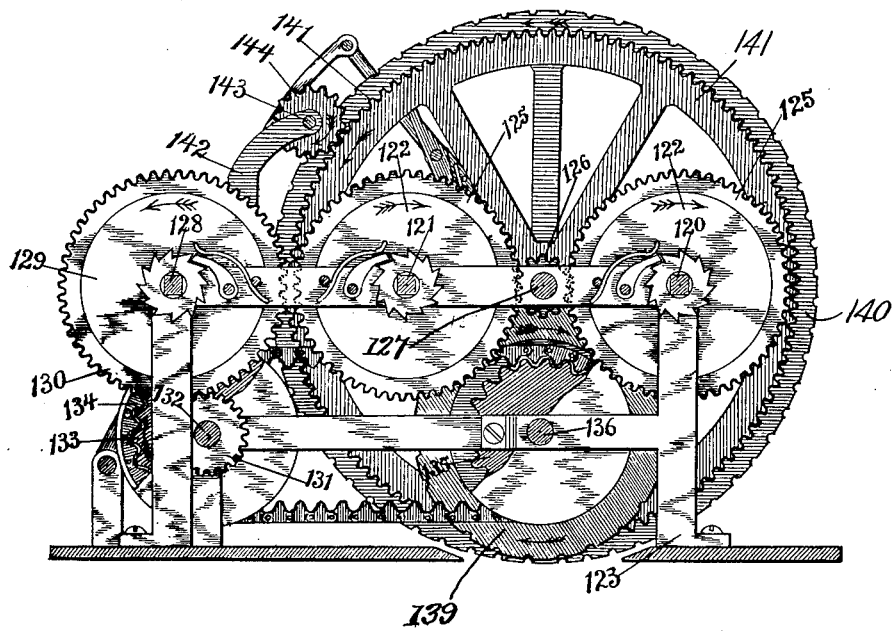

Fig. 25 is a view similar to Fig. 24 of the power and transmission operating devices for the entire printing mechanism.

Figure 26:
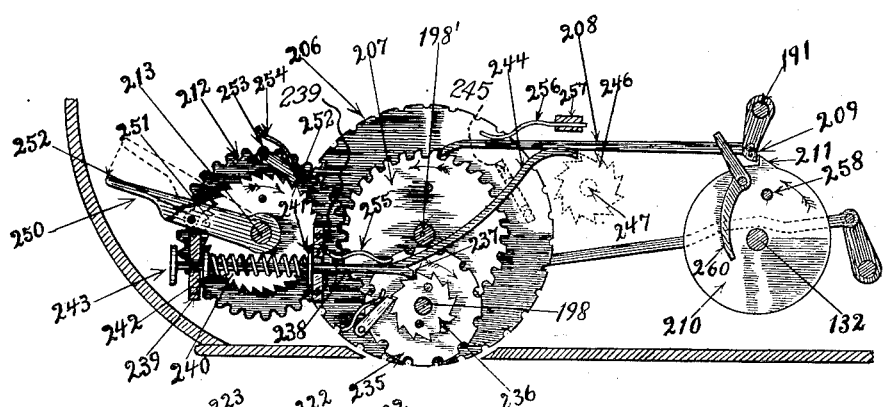

Fig. 26 is a detail front elevation showing one of the date wheels together with the automatic and manually operated setting mechanism therefor.

Figure 27:
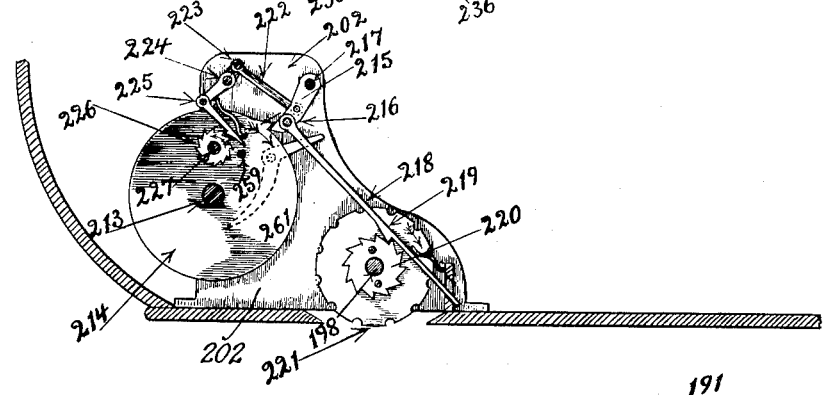

Fig. 27 is a detail showing the month wheel in side elevation and the operating mechanism therefor.

Figure 28:
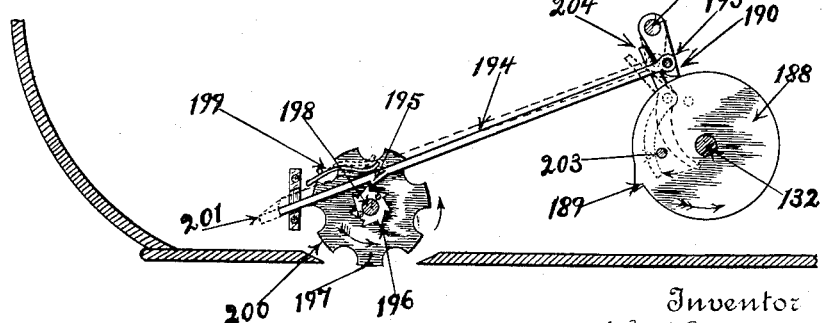

Fig. 28 is a detail showing the day wheel in side elevation and the operating mechanism therefor.

Figure 29 is a fragmentary side elevation of the cushioning means employed for checking the abrupt operation of the mechanism.

Figure 30 is a top plan view of the mechanism with the casing removed.

The upper section or compartment of the casing designated generally by "a" provides the housing for the printing apparatus and the lower compartment of the casing designated generally by "b" in Fig. 1, provides the housing for the carriage operating mechanism. The main shaft 5 (see Figures 2, 5 and 6) for operating the carriage mechanism is reduced at one end as indicated by 6 in Fig. 6, to rotate in a bearing located in the side wall 7 of the compartment b, such bearing not being shown. The opposite end portion of the shaft 5 is rotatable in a tubular shaft 8 which is journaled in the side wall 9 of compartment b, opposite to the end portion 6 and in horizontal alignment therewith. The end portion of shaft 5 extending outwardly beyond tubular shaft 8 is disposed in a circular opening in the oblong handle 11, which is secured against outward displacement on the shaft by a nut 12 or its equivalent. A perforated guide lug 13 on the inner face of handle 11 aligns with a sleeve 14 at the opposite end portion of the handle so that a guide is provided for a dog 15 or its equivalent which is disposed between the handle 11 and the outer end of tubular shaft 8 and which has a non-cylindrical recess 16 for snugly receiving a correspondingly shaped section 17 on the projected end portion of shaft 5, and which communicates with an enlarged recess 18 of considerably greater area than the non-cylindrical section 17 so that when the last named section of the shaft is disposed in the recess 16, the turning of the handle by applying hand pressure to the hand-hold 19 will operate to turn the shaft 5. The turning of the tubular shaft 8 is effected by engaging the non-cylindrical outer end portion 20 thereof, with the jaws 21 formed by recessing a suitable plate which is secured to the side of the dog in any approved manner as by the rivets 22. The compression spring 23 which surrounds one end portion of the dog so as to bear on the perforated lug 13 and a lug 24 secured to the dog, operates to yieldingly hold the dog in such position that the reduced section 17 of shaft 5 will be normally disposed in the reduced portion 16 of the recess of the dog. A head or pressing surface 25 at the outer end of the dog is provided for facilitating the operation of sliding the dog in the guides 13, and 14, and engaging the jaws 21 with the reduced end portion of tubular shaft 8 when it is desired to turn the latter without turning the shaft 5, it being obvious that when the dog is moved so that the jaws thereof engage tubular shaft 8, the non-cylindrical extension 17 will be in the enlarged portion 18 of the dog. The need for continuing hand pressure on the dog to maintain turning movement of tubular shaft 8 is obviated after the initial turning movement of the handle through the operation of a keeper 26 projecting laterally from the dog 15 engaging with the inner side of a split ring 27, shown in Figure 3, secured to the outer face of side wall 9 in any preferred manner as by rivets 28. The split or opening 29 in the ring and keeper 26 are disposed in alignment in the normal position of the handle at its starting point, and said opening is of a size to permit passage therethrough of the keeper 26. By this construction, when the handle has completed one revolution, the keeper automatically disengages from the ring by moving through split 29 under the action of spring 23, and thus automatically disconnects the handle from the tubular shaft 8 and simultaneously connects the said handle with the shaft 5. Screws 30, Figure 1, extend through a dished plate 31, which surrounds the ring 27 and forms a protector for the handle and dog and which has an opening through which extend the head 25 and the handle 19, the screws 30 entering threaded openings in the handle 11 so as to secure the plate 31 to the handle, thereby enabling the plate to turn with the handle. A ratchet wheel 32 (see Figs. 2, 6ᵇ and 10) keyed to tubular shaft 8 cooperates with a pawl 33 secured to the side wall 9 of the compartment b to prevent turning movement of the tubular shaft 8 other than in a clock-wise direction. A spur gear 34 rotatable with tubular shaft 8 meshes with a spur gear 35 keyed or otherwise secured to a shaft 38 having bearings in the side 9 of compartment b and in a bracket 36 disposed within the said compartment. A sector 39 is secured to shaft 38 and provided with crank pin 41 to which is connected one end of a push rod 42 that is slidingly mounted in the stem 43, Figures 4 and 5, of a T-shaped rock arm disposed in compartment b, and pivotally connected at its lower end to a bracket 44 on the base plate 45 of said compartment. A block 45' secured to the push rod between the stem 43 and the crank pin 41 abuts the stem 43 and operates to move the rock arm in one direction during the rotation of the sector 39 and the reciprocation of the rod 42. A head 47 on the free end of the push rod provides an abutment for one end of a compression spring 47' which embraces the free end portion of the push rod and bears on the cross piece 48 of the rock arm. During the rotation of shaft 38 and sector 39 in the direction of the arrow shown, Figs. 4 and 5, the rock arm is moved to the right until an extension 49 on the stem 43 engages a cam 50 keyed to tubular shaft 8 and to spur gear 34 as shown in Fig. 2. This contact is made initially at a point approximately opposite to a shoulder 51, and from this point to the shoulder 51 the radius of curvature is greater than the remainder of the cam. The proportion of the parts is such that the movement of the rock arm from its normal retracted position to the cam 50 corresponds approximately to one quarter (¼) of the length of the stroke of rod 42 so that the rod 42 moves independently and without the rock arm throughout the time that the crank pin 41 moves to the outermost point of its stroke. During this time the head 47 operates to compress the spring 47' so that when the shoulder 51 clears extension 49, the tension of the spring operates to move the rock arm relatively to the push rod 42. Upon return movement of the push rod, head 45' operates to restore the rock arm to its normal position. During this time extension 49 rides on the lower portion of the surface of cam 50 or that having the smaller radius. The sides 52 and 53 of a carriage frame are connected at one end by a cross bar 54 which extends loosely through openings in one end of depending arms 55 which are slidingly fitted in openings 58 in the cross piece 48 of the T-shaped head. The carriage frame supports a table 57 superimposed thereon and fixedly secured thereto in any approved manner. Upstanding flanges 59 are disposed near the side edges of table 57 and are connected at one end to an end flange 60, to which is secured one end of a guard plate 61. This guard plate is held in spaced relation to the table by the flange 60, and operates to provide a guard for the sheet or card to be operated upon. The lateral longitudinal edge portions 63 (see Figs. 2 and 11ª) of the table which project beyond the flanges 59 constitute flanges which slide in the guides 64, in upstanding stationary portions 65 of compartment b. An opening 67 in table 57 exposes the transversely disposed and parallel platens 68 and 69. The guard plate 61 is provided with a recess 70 through which the platens 68 and 69 are exposed as shown in Fig. 11ª. The platen 69 as shown in Figures 20, and 21, is of general rectangular form and has a narrow lower side formed by its converging ends 70', connected to the arms 71 and 72, as shown in Fig. 14 which are mounted to swing on a spindle 73, the opposite ends of which are secured in the sides 52 and 53 of the carriage frame. The platen 68 has upper and lower sides each substantially the same width, and the lower side is secured to the arms 74 and 75 which extend underneath the overhanging end portions formed by the convergence of the ends 70 of platen 69 and are disposed laterally of arms 71 and 72. These arms are pivotally connected as shown in Fig. 14, to spindle 73. Leaf springs 76 and 77 are disposed between the arms 72 and 75 and the table 57, and are secured to the said arms and operate normally to depress the platens 68 and 69 below the surface of the table 57. The spindle 73 is so disposed, and the lengths of the arms 71, 72, 74 and 75, together with the heights of the platens 68 and 69 are so proportioned that the lower sides of the platens 68 and 69 extend into the path of movement of the elevated portions 78 on the sector 39 with the result that the platens 69 and 68 are successively engaged by the elevated portions 78 and projected upwardly through the opening 67 of the table, to move the surface of the card or sheet 62 into contact with the printing mechanism c. It will be observed that the sector moves in the direction of the arrow and that when positioned as shown in Figure 4, the first elevated portion thereof engages with the lower side of platen 69 and elevates the same together with the card 62 disposed thereon. Continued movement of the sector in the direction of the arrow accompanies longitudinal movement of the carriage to the right, when the shoulder 51 moves beyond extension 49 so that when the carriage is moved by the tension of spring 47, the first elevated portion of the sector moves to engage the platen 68 and the second elevated portion takes the position with respect to platen 69 previously taken by the first elevated portion. The engagement between the first elevated portion and the first named platen 69 effects the printing of one line of matter on the card, and when the platen 68 is elevated the second line of printing is had upon the card. The end of the frame remote from the cross bar 54 is connected by an end piece 79 and this end portion extends a trifle beyond the end flange 60 of the table so as to provide a space, in which is disposed an inking roller 80 mounted on a shaft 81 and disposed in a semi-circular ink containing tank 82, the construction of the roller being such that contact is made thereby with the printing wheels of the mechanism c on the outward and inward strokes of the table 62.

The mechanism thus far described, operates in conjunction with tubular shaft 8 and when the dog is depressed so as to engage the keeper 26 with the interior of the split ring 27. When the handle is turned and the tubular shaft 8 is inactive which takes place when the keeper 26 is positioned exteriorly of the split ring 27, the shaft 5 rotates and operates a mechanism identical with that just described. The mechanism operated by tubular shaft 8 is active while the mechanism about to be described is inactive and in normal position and the positions of the parts shown in that figure for the inactive mechanism are similar to those occupied by the active mechanism when the same is in normal inactive position. The ratchet wheel 83, spur gear 84, cam 85 corresponding to the ratchet wheel 32, pawl 33, gear wheel 34, and cam 50 previously described, are secured so as to rotate with shaft 5. Gear wheel 84 meshes with gear wheel 86 which is keyed to shaft 87 corresponding to shaft 38 and mounted in bearings in partitions 89 and 90 in compartment $b$. Sector 91 on shaft 87 has a crank pin 92 to which is connected one end of push rod 93 which is slidingly mounted in T-shaped rock arm 94 which is pivoted to the bottom of compartment $b$ as indicated by 95. Compression spring 96 surrounds the projecting end portion of push rod 93 and bears at one end against a head 97 and at its other end against a rock arm 94. As shown to the left, Figure 2, side members 98 of the carriage frame are connected at one end of cross bar 99, on which are mounted the slide bars 100 which slide in the openings 101, in the opposite end portions of the cross piece or head of the T-shaped arm 94. The table 102 has its marginal side portions slidingly fitted in the guides 103 and the upstanding flanges 104 of the table are connected at one of their end portions to the cross piece which supports a guard plate 105 corresponding to the guard plate 61. The opening 106 in the table, and the recess 107 in the guard plate expose the transverse parallel platens 108 and 109. The construction of these platens is shown in Figures 12, 13, 16, 17, 18 and 19, and are constructed identical with the platens previously described except that the areas of the transverse platens 108 and 109 are somewhat greater than those of the platens 68 and 69. The leaf springs 110 and 111 operate to depress the platens 108 and 109 below the surface of table 102 until the sector operates to elevate the platens 108 and 109 as described in connection with platens 68 and 69. The arms 112, and 113 of the platens 108 and 109 are pivotally connected to the transversely disposed spindle 114. The ink roller 115 mounted on a shaft 116 is disposed in a semi-circular ink containing tank 117 and positioned so as to contact with the type wheels of the printing mechanism $c$. Buffers in the form of bow springs 118, Figure 10, are provided at one end of the guides 64 and 103 and in alignment with the end cross piece 79 of the first mentioned carriage frame and the cross piece 119 of the second named carriage frame so as to cushion any overthrow which might be had from the action of the compression springs 42 and 96 when the rock arms are released by the cams.

The printing mechanism about to be described consists of two parts, one of which operates in conjunction with the carriage mechanism first described and the other part in conjunction with the carriage mechanism last described. The second described carriage mechanism operates to effect printing in duplicate on the card, and the first described carriage mechanism effects the printing of additional matter in duplicate on the card. In other words, the time at which a transaction is begun is printed in duplicate by operating the shaft 5, and the time at which such transaction is finished together with the day, month, and year is placed upon the card when the same is arranged on the carriage shown in Figure 11ª and the carriage operated through the tubular shaft 8. Printing mechanism for printing the card shown in Fig. 1, will be first described together with the clock operating mechanism. The winding posts 120 and 121 of a pair of spring motors of ordinary construction, the casings of which are indicated by 122, are mounted in the supports 123, 124. The teeth 125, see Figure 25, on the peripheries of casings 122, mesh with a pinion 126 on the hand shaft 127, Figure 2, of the clock. The parts thus far described and those hereinafter to be described are wholly disposed within the compartment $a$ of the casing superimposed upon the compartment $b$. Suitable connection will be provided between a suitable clock work mechanism disposed in the frame, and the hand shaft 127 which mechanism will be operated wholly or partly from the shaft 127. The key post 128 of a spring motor 129 is mounted in the supports 123 and 124 of the frame and the peripheral spur gear 130 of the spring motor 129 meshes with the pinion 131 on a shaft 132 mounted in the supports 123 and 124 and carrying between the sides a sprocket wheel 133 over which is trained a sprocket chain 134 which operates a sprocket wheel 135 keyed to a shaft 136 journaled in the supports 123 and 124 and parallel with the shaft 132. The hour wheel 139 is disposed on shaft 136 and supports on its periphery two sets of type faces the numbers in each including the numerals 1 to 12 inclusive. Thus, the motion of the spring motor 129 is transmitted by sprocket chain 134 to the hour wheel 139. A segment of the periphery of the hour wheel projects through an opening in the top plate 66 of compartment $b$ as shown in Fig. 2. The minute wheel 140 is loose upon the hand shaft 127 and disposed adjacent to the hour wheel 139. Type faces 0 to 59 inclusive are disposed peripherally of the minute wheel as shown. A spur gear 141 is secured to the hand shaft 127 between the hour wheel 139 and the minute wheel 140. As shown in Figures 24 and 25 an upstanding arm 142 is provided with a bearing for one end of a shaft 143 the opposite end of which is journaled in the support 124. A pinion 144 secured to shaft 143 meshes with the gear 141. Thus motion is transmitted to shaft 143 to which is secured a ratchet 145 which engages a dog 146 pivoted at one end to the upstanding portion 142. This dog cooperates with the ratchet and pinion to form part of an escapement for the minute wheel by having its other end pivoted as indicated at 147 to one end of a link 148 which forms part of the escapement lever 149 disposed transversely of the minute wheel as shown in Fig. 24. The free end portion of the escapement lever is mounted to slide in a bracket 150 secured to the base of compartment $a$, and terminates in a head 151 which forms an abutment for one end of the spring 152, the other end of which bears on the bracket. The spring is of the compression type and operates to withdraw the escapement lever after the same has been moved in one direction by the action of the ratchet 145 as shown by dotted lines in Fig. 24. A plurality of pins 153 arranged in spaced relation and in circular series project outwardly from one face of the minute wheel and correspond in number to the characters on the minute wheel. A volute spring 154 is connected at one end to the hand shaft 127 and is tensioned by the continuous turning movement of the hand shaft by having its other end connected, as indicated by 155 to the minute wheel which rotates with a step by step movement by means of the spring pressed pawl 156 and the correspondingly constructed pawl 157, the former pawl being pivotally connected to the escapement lever as indicated by 158 and arranged so that its engaging end is normally out of the path of movement of the pins 153. The pawl 157 is connected to the escapement lever 149 and is disposed to normally extend into the path of movement of the pins 153. As shown in Fig. 24, pawl 157 engages one of the pins 153 and pawl 156 is disposed to engage one of the pins 153 substantially diametrically opposite the tooth engaged by pawl 157, so that when pawl 157 is disengaged by the action of the escapement lever, pawl 156 is projected into the path of movement of the pins whereupon the minute wheel will be moved by the tension stored in spring 154 until the pawl 156 is engaged by the next adjacent pin 153 so that the successive movements of said wheel are limited by the spacing of the pins. When the dog 146 is released by the ratchet and moved by spring 152, the engaging end of pawl 157 is projected into the path of movement of the pins before the engaging end of pawl 156 is retracted from the said path by the action of the escapement lever, so that when the pawl 156 is disengaged the minute wheel will continue to turn until engaged by the pawl 157. The step movement of the minute wheel afforded by the pawls corresponds to the spacing between the characters on the periphery of the wheel so that a different character will be available through the opening in compartment $a$ upon each step movement of the minute wheel. The hand shaft 127 is controlled so as to complete one revolution per hour. The ratio of the gear 141 and pinion 144 is such that the ratchet 145 will be turned for a distance equal to the length of a tooth thereof in one minute of time. Obviously with these constructions a different character will be available every hour on the hour wheel and every minute on the minute wheel. One of the pins on the minute wheel is constructed as a cam stud 159 and this stud is disposed so as to operate a cam in the form of an escapement lever 160 pivoted to the upright 142 and disposed so as to engage a ratchet wheel 161 secured to the shaft 132, the said shaft also having secured thereto a semi-circular cam 164. A leaf spring 165 depresses one end of lever 160. The lever is so constructed that its free end normally aligns with the point intermediate adjacent ratchet teeth so that when the cam stud depresses the free end of the lever, and thereby elevates the opposite or engaging end, the ratchet wheel 161 turns until engaged by the free end of the lever which will be for a distance corresponding to the length of a fraction of a tooth thereof. When the cam stud moves beyond the free end of lever 160, spring 165 operates to depress the engaging end whereupon the ratchet wheel 161 moves under the action of spring motor 129 until engaged by the engaging end of the lever. The distance through which the ratchet moves in the two steps of movement just stated corresponds to the length of a tooth. It will be observed that there are 24 teeth on the ratchet and that the same is actuated once every hour through the cam stud 159 so that at this time shaft 132 will be turned one twenty-fourth of a revolution by spring motor 129 and the hour wheel thereby operated. The cam 164 will also turn with the shaft 132 and at the beginning of the P. M. hour one corner of the cam will engage the upper end of a lever 166 of a shaft 167 and thereby rock the same from the position shown by full lines to that shown by dotted lines in Fig. 24. This movement on the part of lever 166 retracts a link 168 connected to lever 166 and to another link 169 which is pivoted to the upper end of the A. M.—P. M. stamp 170 disposed adjacent to the minute wheel and pivoted to partition 171 in the frame. The A. M.—P. M. stamp when rocked as just described presents one set of characters either the A. M. or P. M. in alignment with the opening in compartment a. The length of the periphery of cam 164 corresponds approximately to one half the periphery of ratchet 161, so that the duration of contact between the cam and the lever 166 will correspond to 12 hours. When the cam moves beyond lever 166, leaf spring 172 operates to depress link 169 and rock stamp 170 so that the portion thereof bearing the P. M. stamp for instance will be in alignment with the opening in compartment b. The mechanism about to be described operates to print time A. M. or P. M., day, month, day of the month, and year and operates in connection with the carriage shown in Fig. 11ª. The hour wheel 171', Fig. 2 is secured to a shaft to which a sprocket wheel 174, is connected, the said shaft being located directly underneath the hand shaft 127, and journaled in the compartment wall 124. A sprocket chain 175 trained over sprocket 174 is also trained around sprocket wheel 176 secured to shaft 132. Obviously with this construction hour wheel 171 will operate in unison with hour wheel 139. Minute wheel 177 is rotated on hand shaft 127. Shaft 178, journaled in partitions 174 and 179, has at one end a toothed wheel indicated by 180 in Fig. 24 which engages with the pins 153 on minute wheel 140; the opposite end of shaft 178 is provided with a toothed wheel 181 which engages with the circular series of pins 182 corresponding in number and disposition to the pins 153 and arranged on a face of minute wheel 177. Obviously with this construction motion is imparted by minute wheel 140 to minute wheel 177, the latter operating in unison with the former. Shaft 167 which carries crank arm 166 and operates the A. M. and P. M. stamp previously described, has bearings in the partition wall 183 and an upstanding arm 184. Arm 185 similar in construction to the crank arm 166 is secured to shaft 167 and a link 186 connects the crank arm with an A. M. and P. M. stamp 187 disposed adjacent to the minute wheel 177. With this construction it is to be observed that A. M. and P. M. stamp 187 will operate simultaneously with the A. M. and P. M. stamp 170. A disk 188 is secured to shaft 132 and rotates therewith and is peripherally provided with a tooth 189 shown in Fig. 28 which upon completion of one revolution of the disk engages with a pawl 190 mounted on a jack shaft 191 projecting laterally from partition 192 and connected by a pivot 193 to a push rod 194 which is provided with a tooth 195 to engage a ratchet wheel 196 secured to the day wheel 197 which is rotatably mounted on a shaft 198, the ends of which are rotatably mounted in the partitions 183 and 192 parallel with the hand shaft 127. Upon each revolution of the disk 188 tooth 189 by engaging with pawl 190 moves push rod 194 longitudinally, whereupon tooth 95, which is yieldingly held in engagement with the teeth of the ratchet wheel 196 by a leaf spring 199, operates to turn the day wheel until the tooth 189 disengages from the pawl 190 at which time the day wheel will have turned in the direction of the arrow shown in Fig. 28 and for a distance sufficient to move the next succeeding type face 200 to the lowermost point in said wheel as shown in Fig. 28. It will be observed that day wheel 197 is peripherally provided with a number of type faces corresponding to the number of days in a week and each type face is provided with faces for imprinting the name of a day, Figure 30. Push rod 194 has its free end disposed in a guide 201 carried by partition 202 and constructed so as to permit of limited rocking movement on the part of the rod when moved by pawl 190. The resetting pin 203 is carried by disk 188 and engages an arm 204 after the pawl has disengaged from the tooth 189 and operates during the turning of the disk to engage the arm with the pawl and restore the same together with the push rod to normal position. With the foregoing construction it is apparent that the day stamp will be operated upon each revolution of shaft 132 which will take place once in every 24 hours. The date wheel 206 (see Fig. 26) is rotatably mounted on shaft 198ª and is peripherally provided with type faces bearing the numerals 1 to 31 inclusive. A toothed wheel 207 is secured to one face of the date wheel and is engageable by a push rod 208 pivotally connected at one end to a pawl 209 mounted on the shaft 191. The number of teeth in gear wheel 207 correspond with the number of type faces on date wheel 206 and are spaced in proportion to the spacing between said type faces. Disk 210 mounted on shaft 132 has a tooth 211 which engages pawl 209 on each revolution of the disk which, as will be understood, takes place once in every 24 hours. Thus it will be seen that the turning of the day wheel 197 and the turning of the date wheel 206 will occur simultaneously. A gear wheel 212 is secured to shaft 213 which is journaled in bearings in the side wall 183 and in the partition 202. A disk 214 (see Fig. 27) is secured to shaft 213 and is provided with a tooth 215 which is arranged so as to engage a pawl 216 mounted on a shaft 217 extending laterally from the partition 202. A push rod 218 is connected at one end to the pawl 216 and has on its underside a tooth 219 which engages with a ratchet wheel 220 secured to the month wheel 221 rotatably mounted on the shaft 198 which carries day wheel 197. There are 12 teeth in the periphery of the ratchet 220, and the pawl 216 and the tooth 215 are so proportioned that the wheel 221 will be turned for a distance corresponding to the length of one of said teeth at each revolution of disk 214. In that each revolution of disk 210 turns gear wheel 207, one thirty-first of a revolution, and since the number of teeth in gear wheel 212 corresponds to the number of teeth in gear wheel 207 the said gear wheels together with disk 214 will rotate at the same speed so that disk 214 will normally make one complete revolution in every 31 days and will then actuate the month wheel 221 so that the same will operate simultaneously with the date wheel and the day wheel. A link 222 connects the pawl 216 with a rock arm 223 secured to a shaft 224 journaled in partition 202 and in the side wall 183. One end of shaft 224 extends through side wall 183 and to this end portion of the said shaft is secured a bell crank lever 225, the free end portion of which is provided with a tooth arranged so as to engage a ratchet 226 secured to a shaft 227, journaled at one end in the side wall 183 and carrying at its free end a disk 228, Figure 27, the outer surface of which has imprinted thereon 12 divisions in which are arranged consecutively the names of the months of the year. There are 12 teeth in the surface of ratchet 226 and the construction and operation of the link and bell crank connection between the shaft and pawl 216 is such that the shaft 227 and the disk 228 carried thereby will be turned for one twelfth of a revolution upon each revolution of disk 214. A disk 229 is secured to the outer end of shaft 198' which carries the month, day, and year wheels. There are 31 divisions indicated on the face of disk 229 in which are arranged consecutively, the numerals 1 to 31 inclusive. It will be seen that upon each movement of shaft 198 disk 229 will move in unison therewith. The rock shaft 167 extends through side wall 183 and its extending end portion is provided with a crank arm 230 carrying a crank pin 231 to which is connected one end of a draw rod 232 disposed in a guide 233 and supporting at its free end portion a panel 234 upon the face of which is arranged the characters P. M.—A. M. With this construction it will be seen that the draw rod 231 will operate when shaft 167 which as before described, is rocked at the beginning of the A. M. and P. M. period to operate the A. M. and P. M. stamps as previously described. The year wheel 235 (see Fig. 26) is journaled on the shaft 198 between the date wheel and side wall 183. The ratchet wheel 236 is secured to one face of the year wheel and may have any desired number of teeth. The ratchet is operated by a projection 237 carried by a push rod 238 mounted in guides 239 secured to the inner face of side wall 183, and between which is disposed a compression spring 240 one end of which abuts a washer 241 loose on the push rod 238 and the other end of which abuts a head 242 secured to the push rod. A button 243 is secured to the outer end of the push rod and is accessible through an opening in the front of compartment a. An upwardly inclined extension 244 of the push rod extends through a guide 245 and its end portion is disposed so as to engage a ratchet 246 secured to a shaft 247 journaled in the side wall 183 and carrying at its outer end a disk 247' on the outer surface of which are a plurality of divisions in which are arranged numerals designating a series of years such as 1920, 1921, etc. With this construction it is obvious that the year wheel is set manually when necessary by applying pressure to the button 243 to operate the push rod 238 which also operates the disk 247'. The clock face 248 is disposed over the disks 228, 229 and 247' and clock face 248 and has openings 249 disposed so as to expose a portion of each so as to render visible the date, month and year as well as the A. M. or P. M. period. Thus it will be seen that when a suitable clock work is provided and the clock hands operate synchronously with the printing mechanism, the set or adjustment of the latter will at all times be indicated by the matter appearing in the openings 249 of the clock face 248. This construction also enables the clock to function as a calendar. It will be remembered that the date wheel 206 is constructed so as to be used in connection with a month of 31 days. When a month having less than 31 days follows a month having that number, the date wheel 206 and the month wheel 221 are advanced by operating a lever 250 journaled on the shaft 213 and arranged so as to be accessible through the opening in the front of compartment a, adjacent to push button 243. A pawl 251 carried by the lever 250 is operated by a leaf spring to engage a ratchet wheel 252 secured to gear wheel 212 so that when the lever 250 is moved from the position shown by full lines to that shown by dotted lines, the turning of gear wheel 212 and its associated mechanism is effected. A pawl 253 operated by a spring 254 engages the ratchet 252 and prevents return movement of the latter and the parts operated thereby during the downward movement of lever 250. A leaf spring 255 connected to one of the guides 239 is disposed so as to engage the year wheel 235 and prevent accidental turning movement thereof. The leaf spring 256 carried by cross piece 257 secured to the side portion 183 operates to hold the end of push rod 208 in engagement with the gear wheel 207. Studs 258 and 259 operate during the turning of the disks to engage rock arms 260 and 261 to reset the pawls 209 and 216 and their associated mechanism after each operation.

From the foregoing it will be observed that the parts in moving to indicate change from one period of time to another, operate abruptly. This is accomplished of course by the sharp make and break contact between the various disks, pawls, etc. In that this operation is produced by the spring 129, it is evident that when the spring is under great tension, the parts will move with considerable force, and in order to cushion the shock, a ratchet wheel 262 is secured to shaft 132 which is operated by the motor 129. An upright 263, Figure 30, is provided for supporting a spindle 264 on which is mounted a pawl 265 to which is connected one end of a draw head 266 surrounded by a compression spring 269 which bears at one end on the pawl and at its opposite end on a head 267 secured to head 266. The head is mounted against rotation in a guide 268 and terminates in a screw which operates to vary the tension of the spring by the turning of a milled nut 270 screwed thereon. With this construction it is obvious that the action of the spring 269 operates to retard the movement of the pawl under the pressure of the teeth of ratchet 262 when the said ratchet is turning and its presence provides a yielding abutment, for the teeth of the said ratchet as they successively turn into contact with the pawl.

A rock shaft 271 is disposed transversely in the lower portion of compartment $a$ and is provided with arms 272, 273 arranged to bear on the flanges 59, and 104 of the carriage plates 57—102 and to be engaged by cam faces 274—275 on said flanges. The disposition of the cam faces 274—275 is such that arms 272—273 are engaged and thereby tilted at the end of the first step of movement of the carriages. Such engagement occurs during the time that the platens elevate the cards into contact with the printing wheels. The tilting of arms 272—273 rocks the shaft 271 and effects engagement between pawls 276—277 on said shaft and with the walls of certain of the recesses, 278 formed in the peripheries of the minute wheels. This action on the part of the pawls positively locks the minute wheels against turning during printing operation.

From the above description it is believed that the operation of the apparatus may be readily understood. Thus, at the start of a transaction of which it is desired to keep a record, the card is arranged on the table 78 and the part 25 is operated to connect the handle lever 11 with the sleeve 8. Upon then turning this handle lever to rotate the sleeve, the table or tray 78 is moved inwardly and the card is printed by the automatic operation of the printing mechanism as illustrated in Figs. 4 and 5 of the drawings, and as above described in detail. It will of course, be understood that since the positions of the various printing wheels are controlled by the clock mechanism, the time of the day and the month and year will be accurately printed upon the card. After the revolution of the sleeve 8 is completed, the tray or table returns to its normal position and the card is removed therefrom. The part 25 of course, also returns to its normal position so that the lever 11 is thereby disconnected from sleeve 8 and locked to the shaft 5. Therefore when, after completion of the transaction, the card is placed upon the other table or tray 102 and the lever 11 then operated, said shaft 5 will be rotated to move said tray and actuate the other of the printing mechanisms last described and illustrated in Fig. 12 of the drawings, thus printing upon the card the time of this second operation, whereby when the card is removed, it will show the elapsed time between starting and terminating the particular transaction. Of course, it will be understood that if desired, the two printing mechanisms may be operated in reverse order to that just described, and the time of starting a transaction may be printed upon the card with the part 25 in normal position and the lever 11 connected with the shaft 5 while in the second operation to print the time of termination of the transaction on the card, the part 25 will be operated to connect lever 11 with the sleeve 8.

In operation the card to be printed is placed on the table 102 of the carriage at the left hand side of the machine, under guard plate 105. The crank handle 19 is then rotated without depressing the thumb button 25 so as to impart rotary motion to the shaft 5 and operate the T-shaped rock arm 94 through movement of the gear wheel 84 which drives the gear wheel 86. Such movement rotates the sector 91 which causes the push rod 93 to retract and move the carriage rearwardly. During this movement the ink roller 115 distributes a thin film of ink on the type faces exposed through the slot in the base plate dividing the upper and lower compartments $a$ and $b$. Such movement of the handle causes full retraction of the push rod, but the rock arm is held against such movement by reason of its contact with the elevated portion of the cam. Thus the spring 93 is placed under tension so that as soon as the lower surface of the cam is presented to the rock arm, the energy stored in the spring will force the rock arm to full retracted position.

During movement of the carriage to its partial retracted position, the sector 91 rotates through the medium of the gear wheel 86, so that one of its elevated portions engages the platen 109 and forces the same upwardly thereby forcing the card into contact with the type faces. This operation is accomplished during the time that the rock arm is riding against the high face of the cam and such operation is completed before full retraction of the carriage.

Upon further movement of the crank handle, the cam is rotated to permit full retraction of the rock arm under the influence of the spring 96. Such movement will shift the carriage so as to bring the platen 108 directly beneath the exposed type faces. Simultaneously with this movement the sector is moved so that its other elevated portion contacts with the under side of the platen 108 and causes the card to again engage the type faces, thus producing a duplicate record on the card.

Simultaneously with the movement of the carriage into printing position the cam faces 274—275 move arms 272—273 into such position as to cause the pawls 276—277 to engage in peripheral recesses formed in their respective minute wheels, thus locking the wheels against movement during both printing operations.

Upon further movement of the crank handle 19, the carriage is returned to its normally projected position and the card may be withdrawn and subsequently filed in a suitable record cabinet. With the completion of the job or operation to which that card refers, it is placed on the table at the right of the device beneath the guard plate 61 and pressure is applied to the head 25 of the dog 15 so that the shaft 5 is disengaged and the tubular shaft 8 may then be rotated to operate the mechanism on the right of the device in a manner similar to that previously described. Thus a complete time record showing the time consumed for a particular job or operation is produced which will prove valuable in accounting and general business control.

Obviously upon a return of the tables to the normally projected position the time controlled mechanism is released and its operation may proceed in the customary manner. Owing to the locking of the time controlled mechanism during the printing operation, danger of confusion of the matter printed on the card is eliminated and a clear clean record is thus made.

Although I have shown and described an ideal embodiment of my invention, it is to be understood that I am not to be limited to the detail and construction of parts herein shown many minor mechanical changes within the scope of the appended claims may be made without departing from the spirit or sacrificing any advantages of the invention.

I claim—

1. In a recorder having a support, a spring motor carried by the support, a plurality of groups of printing devices each including a plurality of wheels peripherally provided with stamps adapted to be operated simultaneously by the spring motor, and carried by the support, a plurality of carriages each adapted for supporting a record sheet and further adapted to reciprocate on said support and convey the record sheet into and out of contact with the said printing device, and selectively connected means for reciprocating said carriages each independently of the other.

2. In a recorder having a support, a spring motor carried by the support, a plurality of groups of printing devices connected one to the other, and each including a plurality of wheels peripherally provided with stamps and adapted to be rotated simultaneously by the spring motor, and carried by the support, a plurality of carriages each adapted for supporting a record sheet and further adapted to reciprocate on said support and convey the record sheet into and out of contact with the said printing device, and selectively connected means for reciprocating said carriages each independently of the other.

3. In a recorder having a support, a spring motor carried by the support, a plurality of groups of printing devices connected one to the other and each including a plurality of wheels peripherally provided with stamps and adapted to be rotated simultaneously with a step by step movement by the spring motor and carried by the support, a plurality of carriages each adapted for supporting a record sheet and further adapted to reciprocate on said support and convey the record sheet into and out of contact with the said printing device, and selectively connected means for reciprocating said carriages each independently of the other.

4. In a recorder having a support, a spring motor carried by the support, a plurality of groups of printing devices connected one to the other, and each including a plurality of wheels and arms provided with stamps and adapted to be operated simultaneously and with an intermittent motion by the spring motor, and carried by the support, a plurality of carriages each adapted for supporting a record sheet and further adapted to reciprocate on said support and convey the record sheet into and out of contact with the said printing device, and selectively connected means for reciprocating said carriages each independently of the other.

5. In a recorder having a support, a spring motor carried by the support, a plurality of groups of printing devices connected one to the other, and each including a plurality of wheels peripherally provided with stamps and adapted to be operated simultaneously by the spring motor, and carried by the support, a plurality of carriages each adapted for supporting a record sheet and adapted to reciprocate on said support and convey the record sheet toward and away from said printing device, and selectively connected means for reciprocating said carriages each independently of the other, and moving each record sheet into contact with said printing device.

6. In a recorder having a support, a spring motor carried by the support, a plurality of groups of printing devices connected one to the other, and each including a plurality of wheels peripherally provided with stamps and adapted for supporting a record sheet and adapted to reciprocate on said support and convey the record sheet toward and away from the said printing devices and moving different portions of each record sheet successively into contact with said printing devices and means for selectively bringing the work into operative relation with the printing devices.

7. In a recorder having a support a spring motor carried by the support, a plurality of groups of printing devices including a plurality of wheels and arms provided with stamps and adapted to be operated simultaneously with an intermittent movement by the spring motor and carried by the support, a plurality of carriages adapted for supporting a record sheet and adapted to reciprocate on said support and convey the record sheet toward and away from the said printing devices and further adapted for moving different portions of the record sheets successively into contact with the groups of printing devices and means for selectively bringing the work into operative relation with the printing devices.

8. In a recorder having a clock controlled stamping device, a support therefor, a carriage movable on said support, and adapted to engage a record sheet and convey the same into operative position with respect to said stamping device, means for moving the carriage, and means carried by the carriage and operated by the carriage moving means for moving the record sheet from the carriage into contact with the stamping device.

9. In a recorder having a clock controlled stamping device, a support therefor, a carriage movable on said support, including a body portion provided with an opening said carriage adapted to engage a record sheet and convey the same into operative position with respect to the stamping device, means for operating the carriage, and means carried by the carriage and operated by the carriage operating means for moving successively different portions of the record sheet from the carriage into contact with the stamping device and including a plurality of interfitting plates pivoted to the carriage and disposed in alignment with the opening thereof.

10. In a recorder having a clock controlled stamping device, a support therefor, a carriage movable on said support, and including a body portion provided with an opening and a guard superimposed on said body and in spaced relation thereto, and adapted to engage a record sheet disposed between it and the body, means for operating the carriage to convey a record sheet into operative position with respect to the stamping device, and means operated by the carriage operating means for moving the record sheet from the carriage into contact with the guard and the stamping device, and including a plurality of interfitting plates pivoted to the carriage and disposed in alignment with the opening thereof.

11. In a recorder having a clock controlled stamping device, a support therefor, a carriage slidably fitted on said support and including a body portion having an opening disposed so as to move into alignment with the printing device during the movement of the carriage, and a guard superimposed on said body in spaced relation thereto and provided with a recess aligning with the opening of the body, and platen pivotally connected to the carriage and including a plurality of transverse portions aligning with the opening of the body, and means for moving the carriage with a step by step movement, and moving the transverse portions of the platen successively through the opening of the body, and in the interval between the steps of movement of the carriage.

12. In a recorder having a support, a spring motor carried by the support, a plurality of groups of printing devices including a plurality of wheels peripherally provided with stamps and adapted to be operated simultaneously by the spring motor and carried by the support, a plurality of carriages each adapted for supporting a record sheet and adapted to reciprocate on said support and convey the record sheet into and out of contact with the said printing devices, and means for reciprocating said carriages each independently of the other, and including a shaft connected to one of said carriages, a tubular shaft connected to the other of said carriages and surrounding the first named shaft, and an operating handle carried by the support and adapted to engage either of said shafts.

13. In a recorder having a support, a spring motor carried by the support, a plurality of groups of printing devices including a plurality of wheels peripherally provided with stamps and adapted to be operated simultaneously by the spring motor and carried by the support, a plurality of carriages each adapted for supporting a record sheet and adapted to reciprocate on said support and convey the record sheet into and out of contact with the said printing devices, and means for reciprocating said carriages each independently of the other, and including a shaft connected to one of said carriages, a tubular shaft connected to the other of said carriages and surrounding the first named shaft, and an operating handle carried by the support and adapted to engage either of said shafts.

14. In a recorder having a support, a spring motor carried by the support, a plurality of groups of printing devices including a plurality of wheels peripherally provided with stamps and adapted to be operated simultaneously by the spring motor and carried by the support, a plurality of carriages each adapted for supporting a record sheet and adapted to reciprocate on said support and convey the record sheet into and out of contact with the said printing devices, and means for reciprocating said carriages each independently of the other, and including a shaft connected to one of said carriages, a tubular shaft connected to the other of said carriages and surrounding the first named shaft, and an operating handle carried by the support and adapted to engage either of said shafts, said operating handle being normally detachably secured to the first named shaft and adapted to automatically engage said second named shaft when disengaged from the first named shaft.

15. In a recorder having a clock controlled stamping device, a support therefor, a carriage slidably fitted on said support and adapted for conveying a record sheet into operative position with respect to the stamping device and means carried by the support for operating the carriage to reciprocate, and including a rotatable shaft, a rock arm connected to the carriage and to the support, and a lever connection between the shaft and the rock arm.

16. In a recorder, a support, a clock controlled stamping device connected to the support, a carriage adapted for supporting a record sheet and disposed underneath the stamping device, a platen disposed to engage different portions of the record sheet supported by the carriage and adapted to move said portions successively into and out of contact with the stamping device, means for operating the carriage and controlling the same to move in one direction with a step by step movement, and operating the platen to engage the record sheet in the intervals between the movements of the carriage.

17. In a recorder, a support, a clock controlled stamping device connected to the support, a carriage adapted for supporting a record sheet and disposed underneath the stamping device and provided with an opening, a platen disposed to move through the opening of the carriage and to engage different portions of the record sheet and move the said portions successively into and out of contact with the stamping device, means for operating the carriage and controlling the same to move in one direction with a step by step movement, operating the platen to move through the opening of the carriage in the intervals between the movements of the carriage.

18. In a recorder, a support, a clock controlled stamping device connected to the support, a carriage adapted for supporting a record sheet and disposed underneath the stamping device and provided with an opening, a platen disposed to move through the opening of the carriage and to engage different portions of the record sheet and move the said portion successively into and out of contact with the stamping device, means connected to the support and including a shaft and crank and a gear connection between the same for operating the carriage and controlling the same to move in one direction with a step by step movement, and operating the platen to move through the opening of the carriage in the intervals between the movements of the carriage.

19. In a recorder, a support, a clock controlled stamping device connected to the support, a carriage adapted for supporting a record sheet and disposed underneath the stamping device and provided with an opening, a platen disposed to move through the opening of the carriage and to engage different portions of the record sheet and move the said portions successively into and out of contact with the stamping device, means including a shaft connected to the support, a gear wheel, a crank, a rock arm and a yielding connection between the crank and the rock arm for operating the carriage and controlling the same to move in one direction with a step by step movement, and operating to project the platen through the opening of the carriage in the interval between the movements thereof.

20. In a recorder, a support, a clock controlled stamping device connected to the support, a carriage adapted for supporting a record sheet and disposed underneath the stamping device and provided with an opening, a platen disposed to move through the opening of the carriage and to engage different portions of the record sheet and move the said portions successively into and out of contact with the stamping device, means including a shaft connected to the support, a rock arm connected to the carriage and to the support, a crank arm yieldingly connected to the rock arm, a gearing connection between the crank and the shaft, and a cam disk secured to the shaft and arranged for cooperating with the rock arm, the construction being such that the carriage is operated to move in one direction with a step by step movement, and the platen projected through the opening of the carriage in the interval between the movements thereof.

21. In a recorder having a carriage for supporting a record sheet a support for the carriage, a clock controlled printing device connected to the support and disposed so as to operate on the record sheet supported by the carriage and including a clock work controlled hand shaft, a minute stamp wheel loosely mounted on the hand shaft, an escapement for holding the minute wheel against movement on the hand shaft, means for operating the minute wheel and connected to the same and to the hand shaft and adapted to be energized by the turning movement of the hand shaft while the minute wheel is held against movement by the escapement, and means operated by the hand shaft for actuating the escapement to release the minute wheel at predetermined intervals and to engage the same after movement thereof for a predetermined angular distance under the action of the minute wheel operating means.

22. In a recorder having a carriage for supporting a record sheet, a support for the carriage, a clock controlled printing device connected to the support and disposed so as to operate on the record sheet supported by the carriage and including a clock work controlled hand shaft, a minute stamp wheel loosely mounted on the hand shaft, an escapement for holding the minute wheel against movement on the hand shaft, means for operating the minute wheel and connected to the same and to the hand shaft and adapted to be energized by the turning movement of the hand shaft while the minute wheel is held against movement by the escapement, and means operated by the hand shaft for actuating the escapement to release the minute wheel at predetermined intervals and to engage the same after movement thereof for a predetermined angular distance under the action of the minute wheel operating means, a spring operated hour stamp wheel and means for locking and controlling the same to move with a step by step movement, said means being adapted to be engaged by the minute wheel upon each revolution thereof and operated thereby to release the hour wheel to move in unison with the minute wheel.

23. In a recorder having a carriage for supporting a record sheet a support for the carriage, a clock controlled printing device connected to the support and disposed so as to operate on the record sheet supported by the carriage and including a clock work controlled hand shaft, a minute stamp wheel loosely mounted on the hand shaft, an escapement for holding the minute wheel against movement on the hand shaft, means for operating the minute wheel and connected to the same and to the hand shaft and adapted to be energized by the turning movement of the hand shaft while the minute wheel is held against movement by the escapement, and means operated by the hand shaft for actuating the escapement to release the minute wheel at predetermined intervals and to engage the same after movement thereof for a predetermined angular distance under the action of the minute wheel operating means, an A. M.—P. M. stamp and means for operating the same adapted to be actuated by the minute wheel upon each revolution thereof and to operate the A. M.—P. M. stamp on the 12th revolution of the minute wheel.

24. In a recorder having a carriage for supporting a record sheet a support for the carriage, a clock controlled printing device connected to the support and disposed so as to operate on the record sheet supported by the carriage and including a clock work controlled hand shaft, a minute stamp wheel loosely mounted on the hand shaft, an escapement for holding the minute wheel against movement on the hand shaft, means for operating the minute wheel and connected to the same and to the hand shaft and adapted to be energized by the turning movement of the hand shaft while the minute wheel is held against movement by the escapment, and means operated by the hand shaft for actuating the escapement to release the minute wheel at predetermined intervals and to engage the same after movement thereof for a predetermined angular distance under the action of the minute wheel operating means, a date stamp wheel means for locking and controlling the same to move with the step by step movement and adapted to be engaged by the minute wheel upon each revolution thereof and operated thereby to release the date wheel to move in unison with the minute wheel on each 24th revolution thereof.

25. In a recorder having a carriage for supporting a record sheet, a support for the carriage, a clock controlled printing device connected to the support and disposed so as to operate on the record sheet supported by the carriage and including a clock work controlled hand shaft, a minute stamp wheel loosely mounted on the hand shaft, an escapement for holding the minute wheel against movement on the hand shaft, means for operating the minute wheel and connected to the same and to the hand shaft and adapted to be energized by the turning movement of the hand shaft while the minute wheel is held against movement by the escapement, and means operated by the hand shaft for actuating the escapement to release the minute wheel at predetermined intervals and to engage the same after movement thereof for a predetermined angular distance under the action of the minute wheel operating means, a date stamp wheel means for locking and controlling the same to move with the step by step movement and adapted to be engaged by the minute wheel upon each revolution thereof and operated thereby to release the date wheel to move in unison with the minute wheel on each 24th revolution thereof, and a day stamp operating in unison with the date stamp.

26. In a recorder, a support, a motor carried by the support, independent printing devices mounted on the support connected for operation to said motor, carriages movable on the support for receiving a record sheet to convey predetermined portions of the latter beneath predetermined printing devices, and means for selectively bringing the work into the path of operation of the printing devices.

In testimony that I claim the foregoing as my invention, I have signed my name hereunder.

AUGUST N. E. BOOS.